Oct. 13, 1931.  C. J. PRATT  1,827,107
PROCESS AND APPARATUS FOR HYDROCARBON OIL CONVERSION
Original Filed May 13, 1925
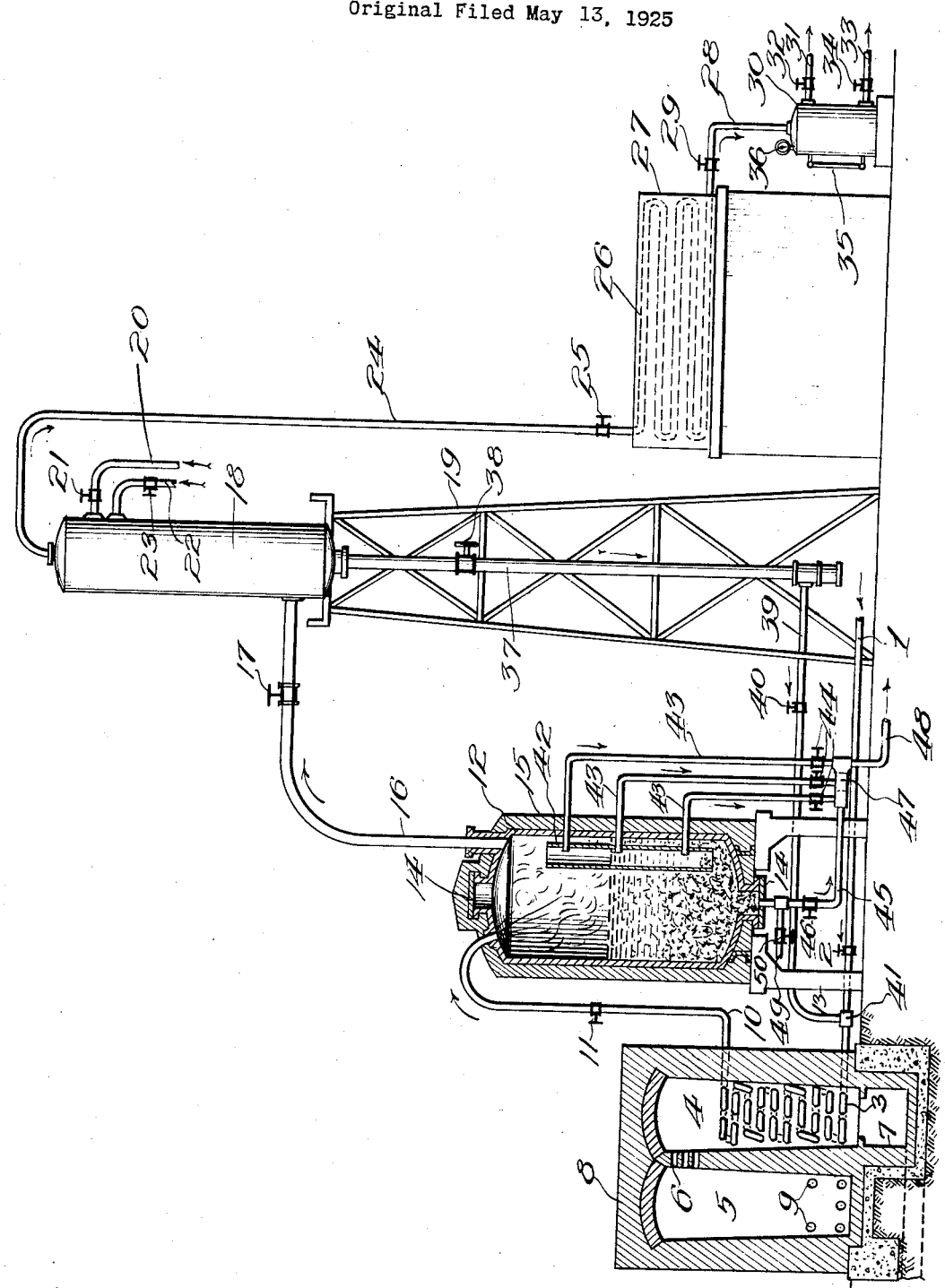
Witness:
Stephen J. Prbora
Inventor:
Clifton J. Pratt,
by Frank L. Belknap
Atty Patented Oct. 13, 1931

1,827,107

UNITED STATES PATENT OFFICE

CLIFTON J. PRATT, OF TULSA, OKLAHOMA, ASSIGNOR TO UNIVERSAL OIL PRODUCTS COMPANY, OF CHICAGO, ILLINOIS, A CORPORATION OF SOUTH DAKOTA

PROCESS AND APPARATUS FOR HYDROCARBON OIL CONVERSION

Application filed May 13, 1925, Serial No. 29,857. Renewed April 30, 1929.

This invention relates to improvements in hydrocarbon oil conversion, and refers more particularly to the separation of the suspended coke-like and pitch-forming particles normally carried in suspension in unvaporized residue withdrawn from the reaction chamber of an oil treating apparatus maintained under heat and superatmospheric pressure.

In the specific embodiment of the present invention, it relates to the idea of causing the unvaporized residue withdrawn from the enlarged reaction chamber to pass upwardly through a pool or liquid body of said unvaporized residue in order that this body or pool might tend to remove certain of the objectionable coke-like and pitch-forming particles carried in suspension. To accomplish this purpose, there is mounted in the reaction chamber an open ended conduit to which is attached residue drawoffs at various heights.

Briefly describing the process here, a substantial portion of the heated oil introduced into the enlarged reaction chamber will separate out in the form of vapors, the unvaporized residue falling to the lower portion thereof and building up into a substantially liquid body. The heavy coke-like particles will gradually accumulate in the bottom of the reaction chamber and it has been found that there will be a gradual decrease upwardly in the density of the product accumulating in the lower portion of this reaction chamber. For instance, the coke of course, is of very heavy density, and progressing upwardly there is a gradual decrease in the density until the liquid in the upper part of the pool has a very low density. The unvaporized liquid residue is continuously withdrawn and is caused to pass in its withdrawal through the bed of coke or carbon accumulated in the bottom of the reaction chamber. This carbon body seems to have an affinity for the coke-like and pitch-forming particles suspended in the residue, and tends to remove substantial portions thereof. Thus the unvaporized residue as it is finally withdrawn from the reaction chamber is substantially freed of its coke-forming and pitch-like particles, rendering said residue immediately fit for use as fuel oil.

In the drawing, the single figure is a more or less diagrammatic side elevational view, partly in vertical section of an oil apparatus equipped for use with my invention.

Referring in detail to the drawing, 1 designates the raw oil inlet line controlled by valve 2 and discharging liquid charging stock into the lower bank of superimposed heating coils 3 forming a continuous elongated passageway from the inlet to the outlet. The coil 3 is mounted in chamber 4 into which the hot combustion gases generated in combustion chamber 5 are introduced through the breeching 6. These gases flow downwardly over the coils 3 counter-current to the upward flow of oil therein, the gases being discharged through the stack 7. The furnace 8 is heated by means of the burners 9 or any other suitable means. After passage through the heating coils, the oil is discharged through the transfer line 10 controlled by valve 11 into the upper portion of enlarged reaction chamber 12 which in the present instance, takes the form of a vertically disposed metal drum mounted on base 13 and having the upper and lower manhole plates 14 to facilitate cleaning. This chamber 12 is preferably unheated but is insulated as shown at 15 to prevent excess radiation of heat. The lighter fractions will separate from the heavier fractions in the chamber 12 in the form of vapors, and will pass upwardly through the vapor outlet pipe 16 controlled by valve 17 into the lower portion of the vertical dephlegmator 18. This dephlegmator 18 is of the usual type and is supported on standards or uprights 19. The baffles, pans or other suitable obstructing elements are placed within the dephlegmator to retard the upward passage of the vapors in order that they may be subjected to the cooling action of the dephlegmator for a maximum period of time to condense all of the heavy fractions contained in said vapors.

The raw oil instead of being introduced through the inlet 1 may be introduced into the top of the dephlegmator through pipe 100

20 controlled by valve 21, or the feed may be split as is well known in this art.

When the charging stock is introduced to the top of the dephlegmator, it may be used as a cooling medium, and an auxiliary cooling medium such as pressure distillate or the like from the process may be introduced through the line 22 controlled by valve 23. The uncondensed vapors after passage through the dephlegmator and after being subjected to the action of the cooling mediums introduced into the top thereof, pass out through the vapor outlet 24 controlled by valve 25, and are condensed in condenser coil 26 mounted in condenser box 27, the condensed liquid flowing through the pipe connection 28 controlled by valve 29 into receiver 30. This receiver may be equipped with the usual pressure relief pipe 31 controlled by valve 32 and liquid drawoff pipe 33 controlled by valve 34, as well as with the liquid sight glass gauge 35 and pressure gauge 36.

The reflux condensate as well as the raw oil or unvaporized portions of the cooling mediums introduced through the lines 20 and 22, is withdrawn from the bottom of the dephlegmator through the reflux leg 37 controlled by valve 38 and is re-introduced through the line 39 controlled by valve 40 to the heating coils 3, merging with the stream of raw charging stock introduced through the line 1 if desired, at the point 41.

The oil in its passage upward through the heating coils 3 is raised to a temperature of say 750° to 950° F., and a superatmospheric pressure is maintained thereon by the regulation of the valves disposed above, or from three to several hundred pounds.

Describing now the feature of the invention, within the interior of the vertically disposed reaction chamber 12, and preferably adjacent one side thereof is an open ended conduit 42 with which the unvaporized residue drawoffs 43 communicate at various heights thereof. These separate residue drawoffs 43 are controlled by valves 44. There is an auxiliary unvaporized residue drawoff 45 controlled by valve 46 leading from the bottom of the chamber and communicating with the header 47 into which the large residue drawoffs 43 discharge, and from which leads a common drawoff pipe 48. A by-pass 49 controlled by valve 50 is provided in the line 45 for discharging the unvaporized residue at any point except into the header 47.

As the separation of lighter fractions from heavier fractions takes place within the reaction chamber 12, carbon particles will be released and will fall to the bottom therein, gradually communicating with and building up a bed of coke in the bottom of said chamber. This coke is more or less porous, and above the bed of coke there will constantly be a body of unvaporized liquid residue. Particles of coke-like and pitch-forming nature will naturally be suspended in said unvaporized liquid residue, and it has been found that if said liquid residue is withdrawn from the reaction chamber, that these coke-like and pitch-forming particles are carried in suspension therein, and will settle out in the lines leading to the fuel oil burners and generally result in clogging of systems in which it is desirable to utilize the residue as fuel or as recharging stock.

It is the object of this invention to remove as much of this coke-like and pitch-forming matter from the unvaporized residue as is possible before withdrawal from the reaction chamber. For this purpose, the open ended conduit 42 is placed in the interior of the chamber 12 having its lower end extending below the top of the bed of carbon after the operation has been carried out for a short while, and its upper end in the vapor space within the chamber. The residue drawoffs are attached at various heights to this conduit 42. Thus, as the liquid residue is drawn off through the drawoffs 43, it is caused to pass downwardly through the bed of coke and carbon accumulated in the bottom of said reaction chamber, which tends to remove a substantial portion of the suspended particles of coke and pitch from this unvaporized residue, and the residue finally withdrawn will be substantially free of suspended coke-like and pitch-forming particles. In other words, the unvaporized liquid removed from the reaction chamber 12 is caused to pass downwardly to a point adjacent the bottom of this chamber, and then upwardly through the conduit 42, permitting the suspended particles to settle from the oil.

It is to be understood of course, that the apparatus described for carrying out the invention is purely illustrative and that the invention can be used with any form of apparatus found desirable.

I claim as my invention:

1. An apparatus for withdrawing unvaporized oil from the drum of a tube and drum oil cracking apparatus, comprising a vertically disposed open ended conduit positioned within the enlarged reaction drum, so that the lower end thereof extends to a point adjacent the bottom of the enlarged reaction drum and the upper end thereof terminates in the vapor space of the enlarged reaction drum, a plurality of vertically spaced valve controlled draw-off lines communicating with said open ended conduit, whereby the unvaporized oil withdrawn from the reaction drum is caused to first pass downwardly through the accumulated residue in the drum and then rise in said conduit, to be discharged through a selected draw-off line.

2. A method for treating hydrocarbon oil which comprises heating the oil to a cracking temperature in a heating zone, delivering the heated oil to an enlarged chamber wherein oil accumulates in a body, preventing return of oil from said enlarged chamber to said heating zone, depositing coke from said body in the bottom of said chamber, maintaining a second relatively quiescent body of oil in said enlarged chamber, admitting liquid oil to said second body from said first mentioned body through the coke adjacent the bottom of said chamber, permitting vapors separated from said second body to unite with vapors separated from the first body, and removing unvaporized residue from said second body to be isolated from the process.

CLIFTON J. PRATT.